E. J. MURPHY.
ELECTROMAGNETIC DEVICE.
APPLICATION FILED FEB. 15, 1911.

1,352,307.

Patented Sept. 7, 1920.
6 SHEETS—SHEET 1.

Witnesses:
Irving E. Steers.
J. Ellis Elm

Inventor
Edwin J. Murphy.
by
His Attorney.

UNITED STATES PATENT OFFICE.

EDWIN J. MURPHY, OF SCHENECTADY, NEW YORK, ASSIGNOR TO GENERAL ELECTRIC COMPANY, A CORPORATION OF NEW YORK.

ELECTROMAGNETIC DEVICE.

1,352,307.  Specification of Letters Patent.  Patented Sept. 7, 1920.

Application filed February 15, 1911. Serial No. 608,652.

*To all whom it may concern:*

Be it known that I, EDWIN J. MURPHY, a citizen of the United States, residing at Schenectady, county of Schenectady, State of New York, have invented certain new and useful Improvements in Electromagnetic Devices, of which the following is a specification.

This invention relates to the control of electric circuits and has for its object the provision of means whereby an electric circuit may be effectively controlled in a reliable, simple and efficient manner.

One of the objects of my invention is to provide an improved electromagnetic device which is inactive when the excitation is high and becomes active upon a lower excitation. In one embodiment of my invention I provide an electromagnet with a movable member upon which two opposing magnetic forces are exerted across respective air gaps. The force acting across one of these air gaps is diminished by a parallel path of limited magnetic carrying capacity which acts as a magnetic shunt of low reluctance when the current, and therefore the magnetic flux is sufficiently small so that a relatively large portion of the total flux is shunted through this iron path. Under these conditions the force across the shunted gap is diminished. When the current, and therefore the flux, is correspondingly higher, the shunt becomes more highly magnetized and ceases to short circuit so large a proportion of the flux and therefore the flux across the air gap which is shunted, and hence the force is relatively increased. With the arrangement above described it is obvious that the distribution of the flux in the two air gaps, one of which is shunted by a path of limited magnetic carrying capacity, varies between wide limits when the total flux is changed. This variation can be further increased by making the iron path in series with the other gap of small magnetic carrying capacity. This electromagnetic device may also be provided with means for producing a time lag of the flux through the magnetic shunt, thus rendering it less active and hence the shunted air gap more active for a short time when the electromagnet is first energized. While my invention is capable of various applications in electric circuits I have found it to be particularly well adapted for use in the control of electric motors. In the control of electric motors it is common to insert a resistance at starting so as to reduce the current through the motor armature. It is also common to vary the speed of a motor by varying the amount of resistance in the armature circuit. Every time a portion or section of resistance is cut out of circuit the current rises. This rise in current is only temporary since the increase in current causes the motor to increase in speed and the counter electromotive force of the motor is thereby increased and the current reduced. In the starting of a motor, as well as in the controlling of its speed, it is often essential that provision be made for preventing the resistance from being cut out too rapidly so as to cause the current to rise to a dangerous value. In some types of motor control, the resistance sections are cut out of circuit by electromagnetic switches which operate automatically in sequence. In systems of control of this character it is common to provide means whereby the closure of the switches is under the control of the current in the motor circuit. This is commonly known as "current limit control". The means for preventing the closure of the switches while the current is temporarily higher than normal has in some cases taken the form of an overload or throttle magnet which controls the actuating circuit of each switch and prevents it from being energized when the current is too high. In other cases an overload device is provided in connection with each switch to prevent the energization of the actuating winding of a succeeding switch. Such arrangements as these involve the use of shunt windings of fine wire, interlocking switches, etc., which adds to the cost and complication of the equipment.

In applying my invention to motor control I provide an electromagnet having a winding which is energized by the motor current, and a switch member actuated thereby which cuts out a section of resistance. This winding is capable of carrying the motor current upon one of the temporary rushes of current incident to the cutting out of a section of resistance. The arrangement is such, however, that although the magnet is energized by this high current it will not operate its switch member until the current falls, due to the speeding up of the motor, to approximately normal value. When the current is high, the switch member is held open by a magnetic force which opposes the magnetic force which tends to close it. As the current decreases the force tending to hold it open decreases until finally when the current reaches a predetermined value, the switch is released and is closed by the other force.

I have found that by the use of means for producing a time lag of the flux through the magnetic shunt, I am able to improve the operation of the switch and obtain the desired current limit control with a very much smaller rise of the current above its normal tripping point than would be required if the means for producing the time lag were not employed. One of the methods by which the time lag may be accomplished, is to provide a short circuit around the magnetic shunt which keeps the shunt inactive for a short time after the current is thrown on and then permits it to act. The same general result may, in a measure, be obtained by providing means for lagging the magnetic flux at some other point, as, for instance, at the main air gap of the switch. This may be accomplished by constructing the upper member which supports the switch core of large cross section and making it of a material of high electrical conductivity, such as copper or brass. In practice, I prefer to employ both of these features in the same switch.

My invention includes as an additional feature means whereby any switch or number of switches constructed as above described may be held open under the control of the operator even when the current has fallen to the predetermined closing value, so that the closure of the switch or switches is not only controlled by the current but is also controlled by the operator.

Other objects and purposes of my invention will appear in the course of the following specification in which I have shown my invention embodied in concrete form for purposes of illustration.

Referring to the drawings which show my invention embodied in various forms.

Figure 1:
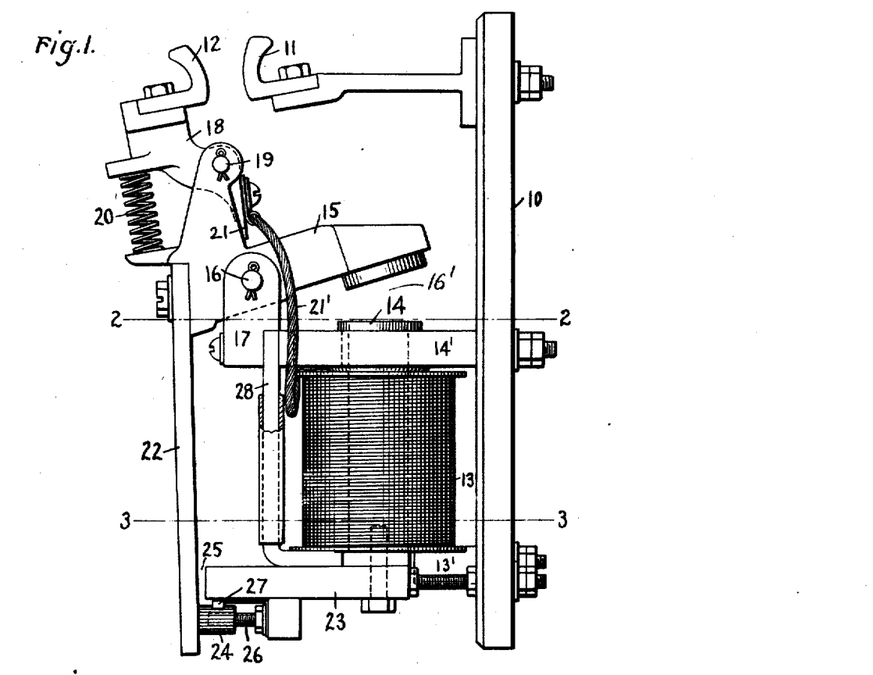
Figure 1 shows one of my electromagnetic switches complete.
Figure 2:
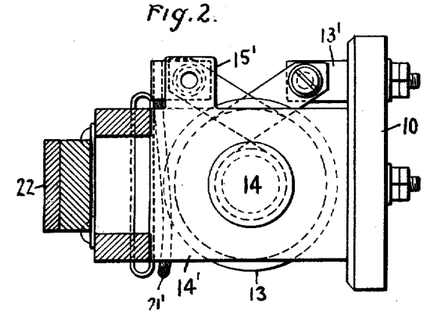
Fig. 2 is a section on the line 2—2 of Fig. 1.
Figure 3:
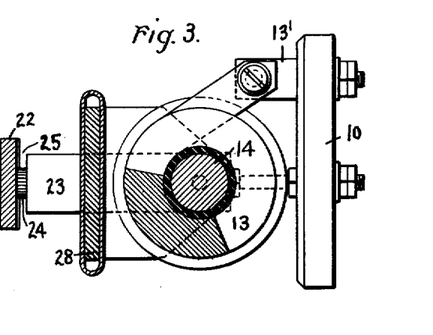
Fig. 3 is a section on the line 3—3 of Fig. 1.

Referring first to Fig. 1, 10 represents an insulating base of slate or soapstone upon which is mounted a fixed contact 11 cooperating with a movable contact 12. An electromagnet 13 having a core 14 of magnetic material is mounted upon the base below the contacts. The core 14 passes through a plate 14' of non-magnetic material, preferably of brass or copper for the reasons above specified. This is secured to the base, and a lug 15' forms a part of the brass plate. One end of the coil winding is connected to lug 15' and the other end is connected to terminal 13', connection being made to these terminals and to contact 11 from the back of the slate base as shown. Coöperating with the magnetic core 14 is a member 15 of magnetic material pivoted at 16 to an iron support 17. This support 17 is secured to the brass plate 14', and is in conductive relation with the brass frame and terminal block. The switch member is in the form of a bell crank lever having a bracket 18 pivoted at 19 for carrying the movable contact 12. This bracket 18 is movable on the pivot 19 to a small extent by reason of the compression spring 20 which forces the projecting end 21 against the bracket. This permits the contact member 12 to move sufficiently when it is forced against the member 11 to furnish a wiping contact. The contact 12 is electrically connected with the supporting member 17 by a copper cable 21'. Secured to the member 15 is a bar 22 of magnetic material which projects downward so as to coöperate with the polepiece 23 of the magnet. This polepiece is in engagement with the core 14 so as to form part of the magnetic circuit through the core. The member 15, together with the bar 22, constitute in effect a single armature for the magnet comprising the core 14 and the polepiece 23, and the weight is so distributed that the parts normally rest in the position shown in Fig. 1. In this position the bar rests against the brass nut 24 which holds the armature bar 22 out of engagement with the polepiece 23 so as to leave a small air gap at 25. The nut 24 is adjustable on screw 26 so as to vary the air gap 25 and the spring 27 acts to hold the nut in any position to which it is turned. The switch member thus has two armature portions 22 and 15, the former coöperating with the polepiece 23 while the latter coöperates with the core 14.

In order to produce a magnetic force between the polepiece 23 and armature 22 across the air gap 25 sufficient to hold the switch from closing against the pull of the core 14 upon the armature portion 15 when the current is high and release it when it is low, I provide a magnetic element 28 which acts as a shunt for the flux of the magnet. This element 28 is in shunt to the air gap 25 and is of limited magnetic carrying capacity. It is secured at one end to the brass plate 14' and at the other end to the polepiece 23. The flux of the magnet thus has two parallel paths, one from the core 14 through shunt 28, iron support 17, arm 15, and air gap 16', while the other path is through polepiece 23, across the air gap 25, armature 22, arm 15, and air gap 16'. The shunt 28 is shown wide so as to act as a screen. When the current through the magnet winding is relatively low and the flux of the magnet correspondingly low, the magnetic element 28 shunts a relatively large portion of the flux around the gap 25 and makes the gap relatively inactive. When the flux is high, due to a higher current, the shunt becomes more highly magnetized and no longer shunts so large a portion of the flux. This causes the air gap 25 to become more active. In other words, when the winding 13 is energized at a relatively high current, two opposing magnetic forces are exerted upon the switch member, the stronger or more effective force acting on armature 22 tending to keep the switch open and the weaker or less effective force acting upon the armature 15 tending to close it. When the current is diminished the stronger magnetic force is weakened by the magnetic shunt path which is now less highly magnetized. While the flux across the gap 16' decreases as the total flux decreases, the flux across the gap 25 decreases much more rapidly, since the flux is approaching the point at which the shunt will carry a very much greater proportion of the total flux. When the current falls to a predetermined value, the pull on the armature 15 overcomes the pull on the armature 22 and the switch is closed. As shown in the drawings, the armature 22 is longer than the arm 15 so as to give it a greater leverage. The magnetic force upon the armature 22 tending to hold the switch open may thus be considerably less than that upon the armature 15 tending to close it and still the switch will be held open. By increasing the air gap 25 the point at which the armature 22 is released may be adjusted. The current in the winding 13 in rising to the higher value at which the switch is held open by the armature portion 22, passes through the lower value at which the switch will close. The closing of the switch at this point may be guarded against under some conditions by suitable design and proportioning of the parts, but the operation may be greatly improved, as before stated, by providing means for introducing a time lag.

One way of accomplishing this I have shown in the drawings. This consists of a short circuit around the shunt. As shown in the drawings, this consists of a ring or band of copper or similar non-magnetic material of low electrical resistance surrounding the shunt. A transient current of high value is thus induced in the ring which temporarily opposes the increase of the flux in the shunt path; that is, it renders the shunt temporarily inactive, thereby causing the air gap 25 to be sufficiently active to hold the switch open while the current is passing through the lower value at which it is adjusted to close. The net result is that when relatively high current passes through the magnet winding the switch will be held open and when the current falls to a predetermined value it will be closed. The relative value of the forces tending to attract the armature 15 toward the end of the core 14 and the armature 22 against the end of the polepiece 23 may be adjusted by varying the relative areas of the air gaps at these two points, in accordance with well known laws of electromagnetic action.

Figure 4:
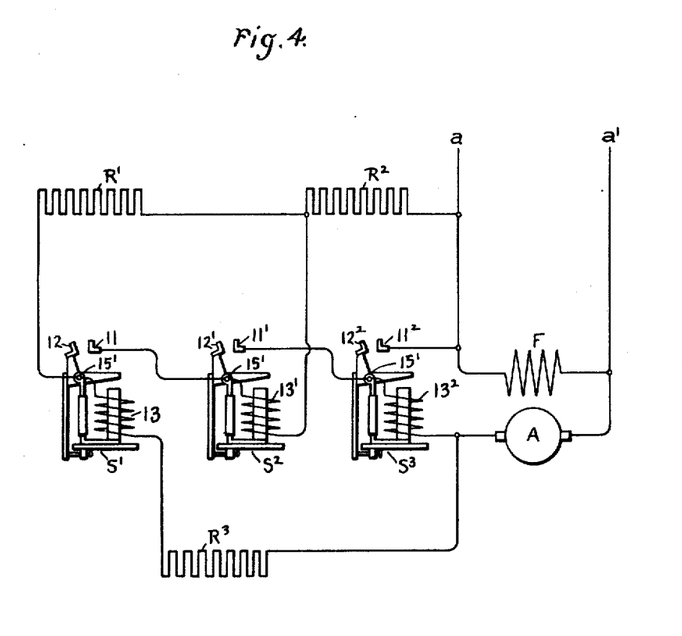
Fig. 4 shows my control system.

In Fig. 4 I have shown a plurality of these electromagnetic switches arranged to be operated successively to cut resistance out of the motor circuit. Referring to this figure, which is purely diagrammatic, A represents the armature and F the shunt field of an electric motor. The starting resistance of this motor is composed of sections divided into two groups, R' and R² constituting one group, while R³ constitues the other group. Switches S', S², S² are arranged to cut these sections of resistance out of the motor circuit consecutively. It will be seen that the fixed contact 11 of each switch is connected with the movable switch member of the next succeeding switch at the terminal 15', thereby also connecting with the actuating coil of the next succeeding switch. It will also be noted that the actuating coil in each case has one terminal connected with its own movable switch member, while the other terminal is connected with a section of resistance. Taking the switches in their order, the first magnet winding is connected with a resistance of one group while the next winding is connected with a resistance in the other group and so on, the successive coils being alternately connected with resistance sections of the two groups.

The operation of the system will be as follows: When voltage is applied to the mains $a$, $a'$, current will pass from the main $a'$ through the armature A, resistance R³, winding 13, resistance R' and R², back to the main $a$. This causes the motor to start with the resistance in circuit. The switch member 12 will not, however, be closed because the current is momentarily high. As the motor armature rises in speed, the current will fall to the predetermined safe value due to the rise in counter electromotive force of the motor and the switch S' will close. When this closes, a section of resistance R' will be short circuited and at the same time the winding 13' will be energized. The direction of current will now be as follows: from the main $a'$, armature A, resistance R³, contacts 12, 11, winding 13', resistance R², back to main $a$. The short circuiting of the resistance R' increases the current momentarily so that the switch S² will not close until the motor speeds up to reduce the current. When the current again falls to the predetermined value the switch S² will close. The closing of this switch short circuits the resistance R³ and at the same time energizes the next succeeding winding 13². It likewise short circuits the winding 13 so as to permit the switch S' to open. The direction of current will now be as follows: from the main a', armature A, winding 13², contact 11', 12', winding 13', resistance R², back to main a. Again the current is increased by the cutting out of the resistance section R³ and when it falls to the predetermined value by the further increase of the speed of the motor switch S³ will close, thereby short circuiting the winding 13' and the resistance R². Switch S² now opens and the motor is connected directly across the line in series with the winding 13², switch S³ now being the only switch which is closed. Upon failure of voltage due to any cause the switch S³ will open and can not be again closed until the other switches are closed in the order stated. It will be seen that this provides a current limit system of control in which each switch has a single series winding and a single switch member, all interlocking switches and auxiliary coils being dispensed with. It is obvious, of course, that my invention is in no sense limited in its application to the particular motor control system described since it may be employed in other systems of control, and in fact is not limited to use in control systems but is adapted for wide application in the electrical art.

Figure 5:
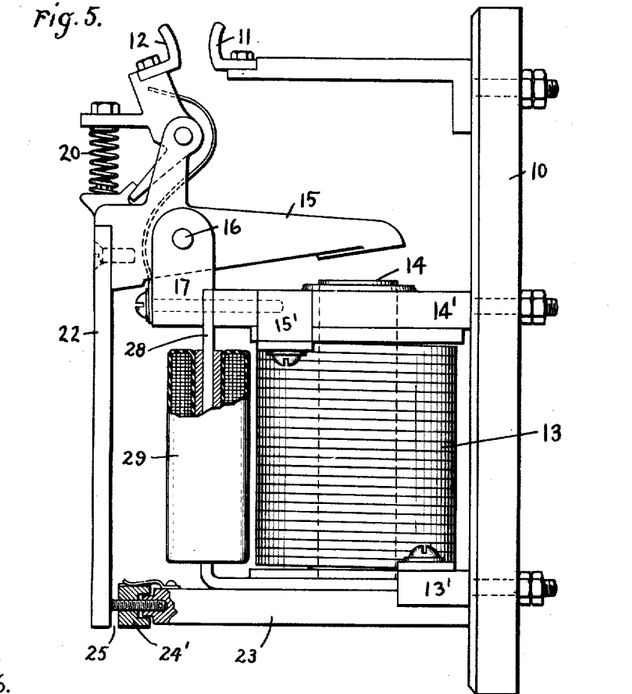
Fig. 5 shows another form of electromagnetic switch.

Whatever the character of the system in which my switches are employed, it is in some cases desirable that means be provided whereby the closing of the switches may be regulated by the operator; that is, it is desirable to have control by the operator in addition to the current limit control. This result I may accomplish in various ways. In Fig. 5 I have shown one method of doing this consisting of an additional winding 29 which holds the switch open while the coil is energized. In this case the coil is mounted upon the shunt 28 so that when the coil is energized the shunt 27 is magnetized in the opposite direction to that in which it is energized by the main winding and the flux across the air gap 25 will be increased to such a point that the switch will be held open under all conditions so long as the coil is energized. The adjustment of the air gap 25 in this case is made in a slightly different manner from that above described in that the air gap is varied by screwing the iron nut 24' toward and from the armature on a stationary screw. This has the advantage that the armature always goes back to the same point against the brass screw upon which the nut is mounted.

Figure 6:
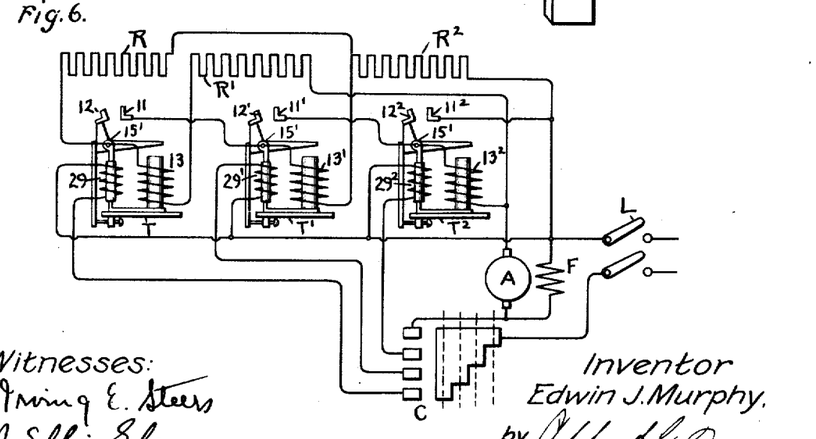
Fig. 6 shows a system of control including a number of switches of the type shown in Fig. 5.

In Fig. 6 I have shown a plurality of switches in a motor control system. It will be seen that it differs from Fig. 4 only in that the controller C is provided for successively controlling the winding 29, 29' and 29². When the line switch L is closed and the controller C is turned to the first position, the actuating winding of the switch T will be energized through the armature A and the resistances R, R' and R². When the current falls to a predetermined value, the switch T will be in a condition to close but will be restrained by the energization of the coil 29. When, however, the controller is moved to the second position the coil 29 will be deënergized and the switch T will close. As before, the closing of the switch T energizes the winding of the switch T' and this latter switch will close when the current falls to a predetermined value and the controller has been moved to the next position. In this way, when the controller is moved to the fourth position the winding 29² will be energized and the switch T² will be closed, thus throwing the motor armature across the line in series with the winding of switch T².

Figure 7:
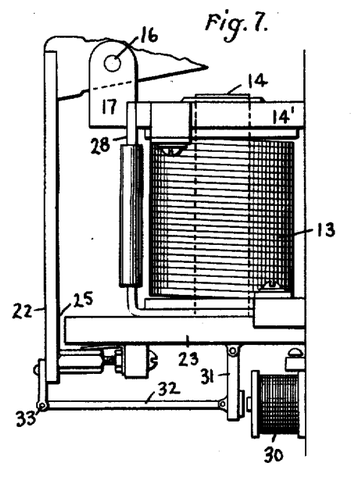
Figs. 7, 8, 9, and 10 are various modifications of my electromagnetic switch.

In Fig. 7 I have shown another means for holding the switch in open position consisting of a winding 30 which acts upon a pivoted armature 31. This armature is connected to a link 32 pivoted to the armature 22 at 33. The arrangement is such that when the winding 30 is energized, the armature 22 will be held against its stop and the switch will be held open.

Figure 8:
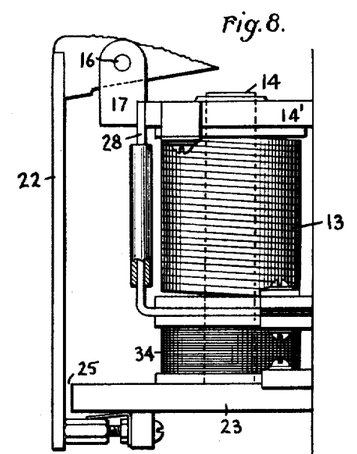

In Fig. 8 I have shown still another method of accomplishing this result. In this case the shunt coil 34 is arranged below the main series coil. When winding 34 is energized it will cause the flux across the air gap to be increased and hold the switch open so long as the winding 34 is energized. When the winding 34 is deënergized it will close as before.

Figure 9:
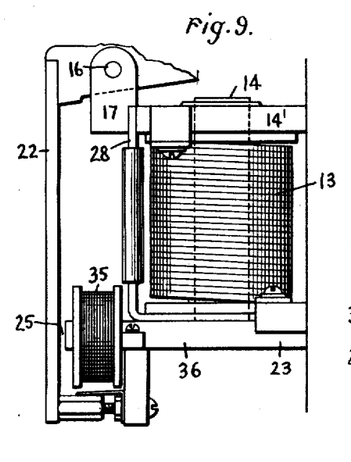

In Fig. 9 I have shown the holding coil 35 mounted on the end of polepiece 36 so as to hold the switch open when the coil is energized.

Figure 10:
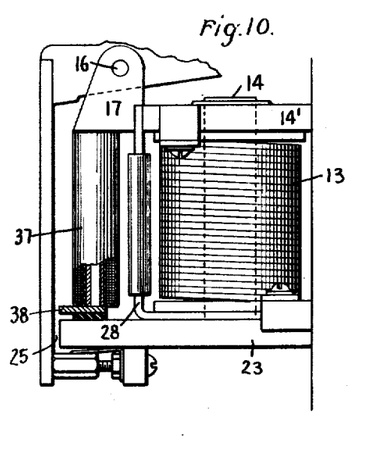

In Fig. 10, coil 37 is mounted parallel with the shunt and a polepiece 38 is arranged adjacent armature 22 so as to hold it as before.

Figure 11:
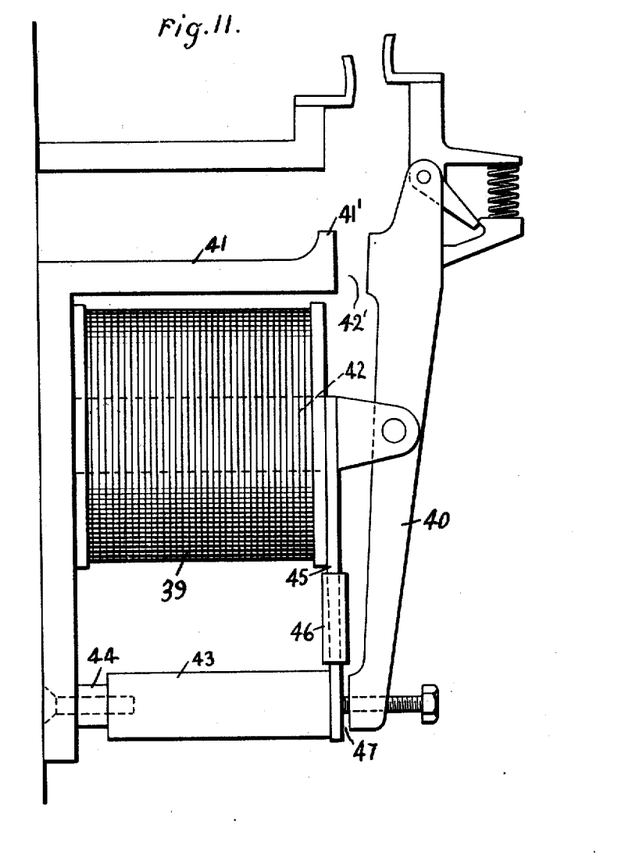
Figs. 11 and 12 are still further modifications of the switch.

In Fig. 11 I have shown a somewhat different arrangement of the switch. In this case there is a polepiece on each side of the magnet 39 and the switch member 40 is pivoted centrally of the magnet. Polepiece 41' forms the end of an iron piece 41 of angular shape secured to the core 42 of the magnet. The other polepiece 43 is connected to the angular polepiece and spaced therefrom by a block of brass 44 which furnishes an air gap. Shunt 45 in this case connects the core of the magnet with the polepiece 43, as shown, and may be provided with a copper encircling strip 46 for the purpose heretofore described. In this case the two paths for the flux are from the core 42 through shunt 45 and also through the switch member 40 across the gap 47 to polepiece 43. If the current in the winding is high a large proportion of the flux is forced across the air gap 47 and the switch member is held in the position shown. When the current diminishes the switch member will be released and attracted by the polepiece 41. The air gap 44 in this switch is the equivalent of the air gap between the armature 15 and the core 14 in Fig. 1 and is desirable in some cases. Without this air gap there would be a permanently closed magnetic circuit.

In some cases it is advantageous to decrease the cross section of the iron path in series with polepiece 41 thus making the iron portion of the path of limited magnetic carrying capacity. For instance, if the iron at 41' is reduced so as to decrease its magnetic carrying capacity, the result will be that the flux across the gap 42' will be relatively smaller with large exciting currents in the coil 39 and will be relatively larger with small exciting currents in the coil. Since the operation of the device depends upon the relative value of the opposing forces, due to the flux across the two air gaps, it is obvious that this arrangement will increase the range of operation.

Figure 12:
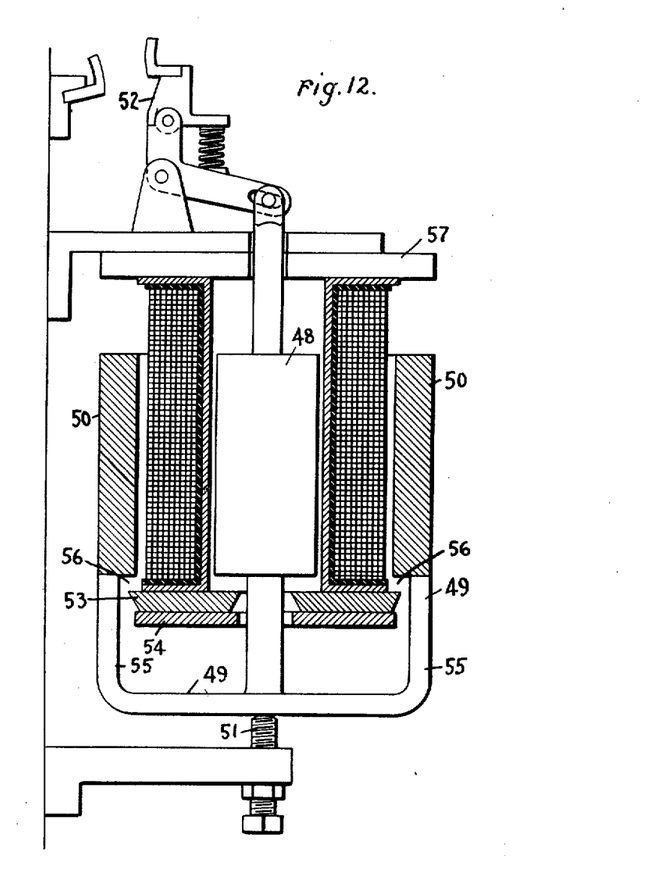

In Fig. 12 I have shown still another form of switch in which a magnet of the solenoid type is employed. In this case the movable core 48 has a U-shaped member 49 secured to its lower end so as to form a polepiece 50 extending around the magnet. The core is supported at the bottom by an adjusting screw 51 and the switch member 52 is connected with the upper end of the core. An iron ring 53 is mounted below the coil and a copper ring 54 is below the iron ring. The portion 55 of the U-shaped member acts as a magnetic shunt. When the current is high in the coil, the flux is forced across the air gap 56, which holds the core in the down position. When the current diminishes, the flux across the air gap 56 diminishes and the core is pulled upward to close the switch by the attraction between the iron plate 57 and the polepiece 50 and core 48.

While I have described my invention as embodied in various concrete forms for purposes of illustration, it should be understood that I do not limit my invention thereto, nor do I limit my invention to the particular connections or mode of operation therein described, since various modifications thereof will suggest themselves to those skilled in the art without departing from the spirit of my invention, the scope of which is set forth in the annexed claims.

What I claim as new, and desire to secure by Letters Patent of the United States, is,—

1. A controlling device for electric circuits comprising a pivoted switch member having an armature portion on each side of the pivot, an electromagnet acting on one of said armature portions to close the switch and on the other armature portion to hold it open, and a magnetic shunt to said holding portion which approaches saturation when the exciting current of the magnet is above a predetermined value and causes the holding force to predominate until the current is decreased to the predetermined value.

2. A controlling device for electric circuits comprising a switch member having two armature portions, an electromagnet coöperating with one of said armature portions to close the switch and with the other armature portion to hold it open, a magnetic shunt to said holding portion which approaches saturation when the exciting current of the magnet is above a predetermined value and causes the holding force to predominate until the exciting current is decreased to the predetermined value, and a copper sleeve surrounding said magnetic shunt for retarding the changes in flux density therein.

3. An electromagnetic device comprising an electromagnet, a magnetic circuit therefor including an air gap, a magnetic element of limited magnetic carrying capacity in shunt to said air gap which approaches saturation at relatively high excitation of the magnet and thereby causes the air gap to become magnetically active, and a short circuited non-magnetic conductor of low electrical resistance surrounding said element for retarding the changes in flux density therein.

4. A controlling device for electric circuits comprising an electromagnet having a stationary core, a switch member having an armature portion coöperating with one end of said core to close the switch and a second armature portion coöperating with the other end of the core across an air gap to hold it open, and a magnetic shunt which approaches saturation when the winding of the electromagnet is energized above a predetermined value connected across the air gap.

5. A controlling device for electric circuits comprising a pivoted switch member having an armature portion on each side of the pivot, an electromagnet acting on one of said armature portions to move the switch member to closed position and on the other armature portion to hold it in open position and means whereby the holding force predominates when the exciting current of the magnet is above a predetermined value and the closing force predominates, to close the switch when the current is decreased to said value.

6. A controlling device for electric circuits comprising an electromagnet having a stationary core, a switch member having an armature portion acted upon by the said core to close the switch and a second armature portion acted upon by the core to hold the switch in open position and means whereby the holding force predominates when the exciting current of the magnet is above a predetermined value and the closing force predominates to close the switch when the current is decreased to said value.

In witness whereof, I have hereunto set my hand this 13th day of February, 1911.

EDWIN J. MURPHY.

Witnesses:
BENJAMIN B. HULL,
HELEN ORFORD.